United States Patent
Schmitt

(10) Patent No.: US 10,115,211 B2
(45) Date of Patent: Oct. 30, 2018

(54) SYSTEMS AND METHODS FOR RECONSTRUCTING PROJECTION IMAGES FROM COMPUTED TOMOGRAPHY VOLUMES

(71) Applicant: L-3 Communications Security & Detection Systems, Inc., Woburn, MA (US)

(72) Inventor: Michael H. Schmitt, Seminole, FL (US)

(73) Assignee: L3 Security & Detection Systems, Inc., Woburn, MA (US)

( * ) Notice: Subject to any disclaimer, the term of this patent is extended or adjusted under 35 U.S.C. 154(b) by 198 days.

(21) Appl. No.: 15/080,741

(22) Filed: Mar. 25, 2016

(65) Prior Publication Data
US 2017/0278281 A1    Sep. 28, 2017

(51) Int. Cl.
*G06K 9/00* (2006.01)
*G06T 11/00* (2006.01)
*G06T 7/00* (2017.01)

(52) U.S. Cl.
CPC .......... *G06T 11/008* (2013.01); *G06T 7/0012* (2013.01); *G06T 11/006* (2013.01); *G06T 2207/10081* (2013.01); *G06T 2207/10116* (2013.01); *G06T 2211/424* (2013.01); *G06T 2211/428* (2013.01)

(58) Field of Classification Search
CPC ................ G06T 7/0012; G06T 11/008; G06T 2207/10081; G06T 2211/428; G06T 11/006; G06T 2211/424; G06T 2207/10116
See application file for complete search history.

(56) References Cited

U.S. PATENT DOCUMENTS

| | | | |
|---|---|---|---|
| 6,088,423 A | 7/2000 | Krug et al. | |
| 7,362,847 B2 | 4/2008 | Bijjani | |
| 7,515,675 B2 | 4/2009 | Garms et al. | |
| 7,606,348 B2 | 10/2009 | Foland et al. | |
| 7,831,012 B2 | 11/2010 | Foland et al. | |
| 8,270,565 B2 | 9/2012 | Oreper | |
| 8,315,353 B1 | 11/2012 | Hsieh et al. | |
| 8,644,549 B2 | 2/2014 | Foland et al. | |

(Continued)

OTHER PUBLICATIONS

Thibault et al. "A three-dimensional statistical approach to improved image quality for multislice helical CT." Medical physics 34.11 (Oct. 29, 2007): 4526-4544.

(Continued)

*Primary Examiner* — Yon Couso
(74) *Attorney, Agent, or Firm* — McCarter & English, LLP; David R. Burns

(57) ABSTRACT

Systems, methods, and non-transitory computer readable media are described herein to facilitate generation of high-resolution two-dimensional projection images of an object having minimal artifacts from three-dimensional computed tomography volumes. Direct or iterative image reconstruction techniques can be used in concert with binning to identify and select measurement data subject to a criterion and resampling of the initial volumetric dataset to generate the high-resolution, two-dimensional projection images of at least a portion of the object.

48 Claims, 11 Drawing Sheets

(56) References Cited

U.S. PATENT DOCUMENTS

| | | | |
|---|---|---|---|
| 8,787,521 B2* | 7/2014 | Thibault | G06T 11/006 378/20 |
| 9,069,092 B2 | 6/2015 | Oreper et al. | |
| 2013/0243299 A1* | 9/2013 | Goto | G06T 11/006 382/131 |
| 2014/0198899 A1 | 7/2014 | Ziskin et al. | |
| 2015/0221067 A1* | 8/2015 | Mahnken | G06T 11/006 382/131 |
| 2015/0317820 A1* | 11/2015 | Choi | G06T 15/08 382/132 |
| 2016/0302746 A1* | 10/2016 | Erhard | A61B 6/025 |

OTHER PUBLICATIONS

Degirmenci, Soysal, et al. "Acceleration of iterative image reconstruction for x-ray imaging for security applications." Proc. SPIE 9401, Computational Imaging XIII, 94010C (Mar. 12, 2015); doi:10.1117/12.2082966.

Gregor, Jens, "Algorithmic Improvements to SIRT with Application to X-Ray CT of Luggage." Proceedings of the Third International Conference on Image Formation in X-Ray Computed Tomography, p. 121-124, Jun. 2014.

International Search Report and Written Opinion by International Searching Authority for International application No. PCT/US2017/023362 dated Jun. 8, 2017.

Xue, Hui, et al. "An iterative reconstruction method for high-pitch helical luggage CT." Proc. SPIE 8506, Developments in X-Ray Tomography VIII, p. 85061O (Oct. 17, 2012).

\* cited by examiner

Receive, using at least one processing unit, measurement data representative of an interaction of x-rays with at least a portion of an object.
301

Receive, using the at least one processing unit, a first volumetric dataset having a plurality of voxels with first voxel dimensions.
303

Select, using the at least one processing unit, a portion of the measurement data corresponding to data obtained from x-rays that are substantially parallel to a view direction of a projection image of the portion of the object.
305

Compute, using the at least one processing unit, a reconstructed second volumetric dataset having a plurality of voxels with second voxel dimensions using the first volumetric dataset and the selected portion of the measurement data.
307

Generate, using a graphic unit, the projection image of the portion of the object along the view direction from the reconstructed second volumetric dataset.
309

Receive, using at least one processing unit, measurement data representative of an interaction of x-rays with at least a portion of an object.
401

Compute from the measurement data, using the at least one processing unit, a reconstructed first volumetric dataset having a plurality of voxels with first voxel dimensions.
403

Select, using the at least one processing unit, a portion of the measurement data corresponding to data obtained from x-rays that are substantially parallel to a view direction of a projection image of the portion of the object.
405

Compute, using the at least one processing unit, a reconstructed second volumetric dataset having a plurality of voxels with second voxel dimensions using the reconstructed first volumetric dataset and the selected portion of the measurement data.
407

Generate, using a graphic unit, the projection image of the portion of the object along the view direction from the reconstructed second volumetric dataset.
409

SYSTEMS AND METHODS FOR RECONSTRUCTING PROJECTION IMAGES FROM COMPUTED TOMOGRAPHY VOLUMES

BACKGROUND

Imaging technologies incorporating penetrating radiation such as x-rays or gamma rays have found widespread use in applications as diverse as medical imaging and cargo inspection. X-ray imaging techniques involve aiming a beam of the radiation at an object to be imaged and measuring the intensity of x-rays received through the object. The attenuation of the x-ray beam depends on material properties of the object such as mass density or effective atomic number. By acquiring such attenuation data over a range of paths through the object, it is possible to reconstruct a three-dimensional or projected two-dimensional image of the object.

In security applications, the three-dimensional volumetric or two-dimensional projection images can be used to detect suspicious or dangerous objects hidden in baggage or cargo, for example, contraband.

SUMMARY

Devices, non-transitory computer readable media, and methods are taught herein that enable reconstruction of high-resolution two-dimensional projection images from computed tomography (CT) volumes with minimal artifacts. The devices, non-transitory computer readable media, and methods taught herein allow the reconstruction of high-resolution projection images along multiple view directions with minimal artifacts without requiring the acquisition of additional measurement data along those view directions.

In some embodiments taught herein, a method of generating a reconstructed projection image of an object is disclosed. The exemplary method includes receiving, using at least one processing unit, measurement data representative of an interaction of x-rays with at least a portion of an object and receiving a first volumetric dataset having a plurality of voxels with first voxel dimensions. The exemplary method further includes selecting, using the at least one processing unit, a subset of the measurement data corresponding to data obtained from x-rays that are substantially parallel to a view direction of a projection image of the portion of the object, and computing, using the at least one processing unit, a reconstructed second volumetric dataset having a plurality of voxels with second voxel dimensions using the first volumetric dataset and the selected subset of the measurement data. A graphic unit is used to generate the projection image of the portion of the object along the view direction from the reconstructed second volumetric dataset.

In some embodiments taught herein, an exemplary imaging system is disclosed that includes an x-ray source, a detector array, a memory, and a programmable processing unit. The x-ray source irradiates at least a portion of an object with a beam of x-ray radiation. The detector array detects measurement data indicative of an interaction of x-rays with at least the portion of the object. The memory stores processor-executable instructions for a direct reconstruction technique, an iterative reconstruction technique, or both. The programmable processing unit has a central processing unit and is communicatively coupled to the memory. Upon execution of processor-executable instructions, the programmable processing unit operates to receive measurement data from the detector array. The programmable processing unit also operates to receive a first volumetric dataset having a plurality of voxels with first voxel dimensions. The programmable processing unit further operates to select a subset of the measurement data corresponding to data obtained from x-rays that are substantially parallel to a view direction of a projection image of the portion of the object. The programmable processing unit further operates to compute a reconstructed second volumetric dataset having a plurality of voxels with second voxel dimensions using the first volumetric dataset and the selected subset of the measurement data. The programmable processing unit further operates to cause a graphic unit to generate the projection image of the portion of the object along the view direction from the reconstructed second volumetric dataset.

Disclosed herein in some embodiments are one or more non-transitory machine readable media storing instructions executable by a processing device having a central processing unit. Execution of the instructions causes at least one processing device to carry out a method for generating a reconstructed projection image of an object. The one or more machine readable media include instructions to receive measurement data representative of an interaction of x-rays with at least a portion of an object and to receive a first volumetric dataset having a plurality of voxels with first voxel dimensions. The one or more machine readable media also include instructions to select a subset of the measurement data corresponding to data obtained from x-rays that are substantially parallel to a view direction of a projection image of the portion of the object, to compute a reconstructed second volumetric dataset a plurality of voxels with having second voxel dimensions using the first volumetric dataset and the selected subset of the measurement data. The one or more machine readable media also include instructions to generate, using a graphic unit, the projection image of the portion of the object along the view direction from the reconstructed second volumetric dataset.

BRIEF DESCRIPTION OF THE DRAWINGS

The skilled artisan will understand that the drawings are primarily for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar or structurally similar elements).

The foregoing and other features and advantages provided by the present disclosure will be more fully understood from the following description of exemplary embodiments when read together with the accompanying drawings, in which:

FIG. 3 illustrates a flowchart of an exemplary image reconstruction methodology in accordance with some embodiments of the present disclosure.

FIG. 4 illustrates a flowchart of an exemplary image reconstruction methodology in accordance with some embodiments of the present disclosure.

DETAILED DESCRIPTION

Figure 1:
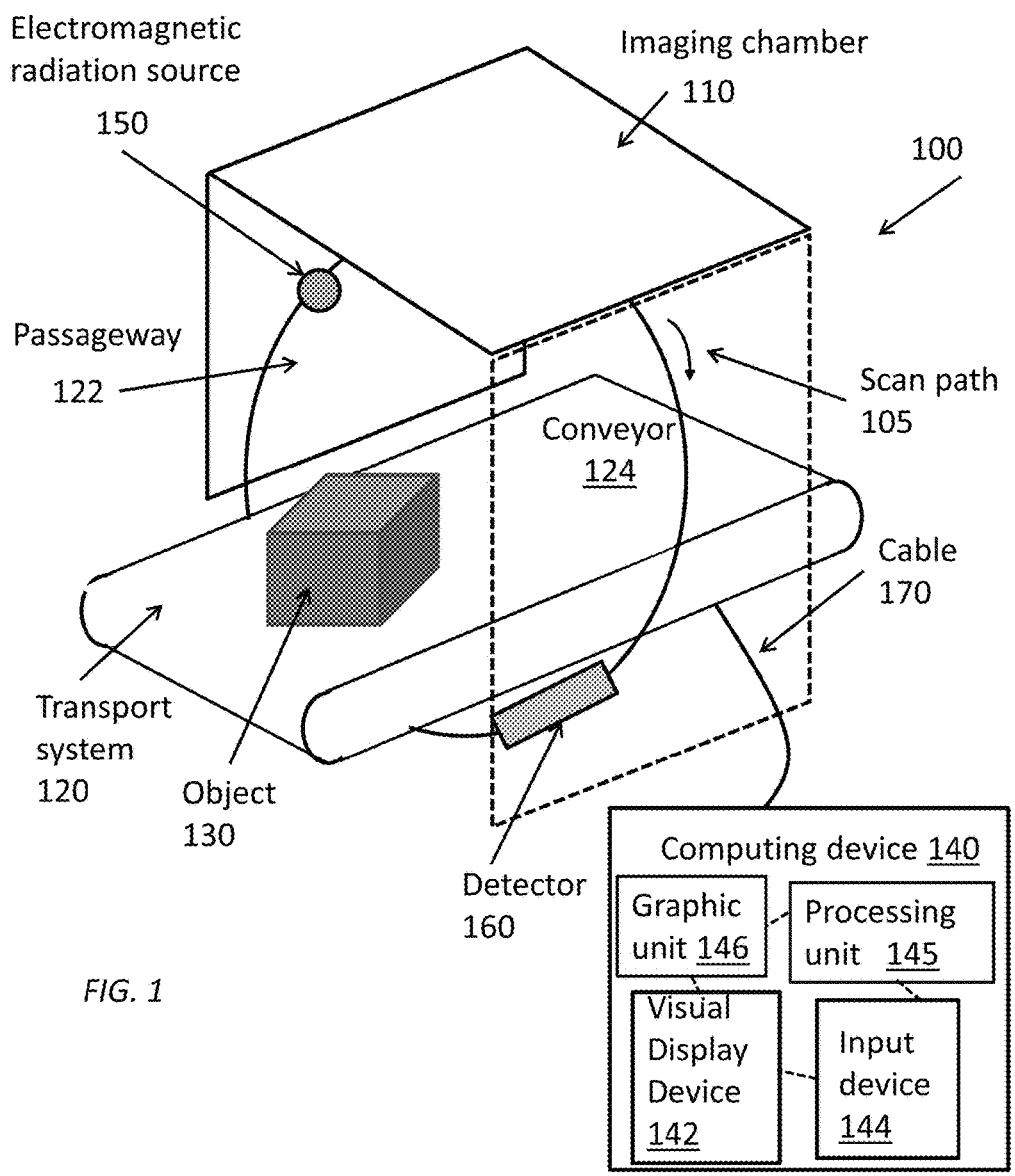
FIG. 1 illustrates an exemplary imaging system, according embodiments of present disclosure.

Taught herein are various concepts related to, and examples of, methodologies, computer readable media, and systems for reconstructing high resolution two-dimensional projection images with minimal artifacts from computed tomography (CT) volumes. In particular, image reconstruction methodologies are taught that improve reconstruction of two-dimensional images along multiple view directions without the need for acquisition of additional measurement data along these view directions. Methods are taught that provide for improved image reconstruction through binning measurement data to identify and select a portion of the measurement data corresponding to x-rays that are substantially parallel to a desired view direction in the image reconstruction process. A first volumetric dataset, for example, a first array of voxels, can be calculated and used as an input into the calculation of a second volumetric dataset, for example, a second array of voxels. The calculation can include a direct reconstruction method, an iterative reconstruction method, or both. The devices, methods, and non-transitory computer readable media taught herein advantageously enable improved resolution and reduction of imaging artifacts in reconstructed two-dimensional projection images.

As used herein, "measurement data" is data indicative of an interaction of x-ray radiation with at least a portion of an object. Measurement data can include, but is not limited to, data indicative of the density or the effective atomic number of the portion of the object.

As used herein, "high resolution" refers to a projection image having a finer intrinsic resolution relative to a projection image that is generated from a first volumetric dataset by conventional means. Intrinsic resolution may be described by the ability to discriminate line pairs or any suitable measure of a point spread function.

As used herein, an image having "minimal artifacts" refers to an image wherein the effect of reconstruction artifacts due to metals or other high-density objects or due to incomplete measurement data on image voxel or pixel intensity values is reduced by at least 90% as compared to conventional image reconstruction methods.

As used herein, "substantially parallel" refers to paths that differ in parallelism by an angle greater than or equal to 0° but not more than an upper bound angle of less than about 45° as measured relative to the offset between two or more paths, for example, paths along a view direction that differ in parallelism by plus or minus five degrees along the view direction, or that differ in parallelism by plus or minus four degrees along the view direction, or that differ in parallelism by plus or minus three degrees along the view direction, or that differ in parallelism by plus or minus two degrees along the view direction, or that differ in parallelism by plus or minus one degree along the view direction, or that differ in parallelism between zero and one degree along the view direction, or any other suitable range of degrees taken along the view direction.

As used herein, "binning" is a process of identifying and selecting data that meets a specified criterion or that is generated by a physical process that meets a specified criterion, such as a geometrical constraint.

As used herein, "resampling" refers to a process of converting a first dataset where individual elements have first dimensions to a second dataset where individual elements have second dimensions. In some embodiments, the second dimensions are different than the first dimensions. In some embodiments, the second dimensions are defined by rotated coordinate axes with respect to the first dimensions.

Exemplary methodologies, systems, apparatus, and non-transitory computer-readable media are described herein to facilitate generation of high-resolution reconstructed projection images of an object, based on measurement data representative of an interaction of x-rays with at least a portion of an object. The measurement data can be collected from the interaction of x-rays directed at the portion of the object from a variety of angles. The measurement data can be used to generate a volumetric dataset using a reconstruction method, such as but not limited to a direct reconstruction method or an iterative reconstruction method. Using the exemplary methodologies, systems, apparatus, and non-transitory computer-readable media described herein, the reconstructed projection image can be generated from the reconstructed volumetric dataset. The exemplary projection images provide a two-dimensional representation of the volumetric dataset from a desired view direction. As a result, the exemplary methodologies, systems, apparatus, and non-transitory computer-readable media described herein can be used to generate high-resolution reconstructed projection images of an object along multiple view directions, with minimal artifacts, and without requiring the acquisition of additional measurement data along those view directions.

FIG. 1 illustrates an exemplary imaging system 100 for generating a reconstructed image of at least a portion of an object 130, according to one embodiment of the present disclosure. The imaging system 100 includes an imaging chamber 110, a transport system 120 to transport the object 130, a computing device 140, an x-ray source 150, and a detector 160. The imaging chamber encloses a passageway 122. The computing device 140 can include a visual display device 142, an input device 144, a processing unit 145, and a graphic unit 146. The computing device 140 can be used to render an image and other interfaces on the visual display device 142 using the graphic unit 146.

The transport system 120 can be configured to transport the object 130 through at least a portion of the passageway 122 of the imaging chamber 110. In accordance with various embodiments, the transport system 120 can include an object transport mechanism such as, but not limited to, a conveyor belt 124, a series of rollers, or a cable that can couple to and pull an object 130 into the imaging chamber 110. The transport system 120 can be configured to transfer the object 130 into the passageway 122 of the imaging chamber 110 at a range of speeds. The transport system 120 can transport the object 130 at any speed that meets allows collection of measurement data of the object 130.

The x-ray source 150 can be configured to emit a conical beam of x-ray radiation (or gamma rays, or other radiation) at a plurality of points along a trajectory around the conveyor 124 on a scan path 105 relative to a direction of transport of the object 130, to irradiate at least a portion of the object 130. In some embodiments, the trajectory around the conveyor 124 on the scan path 105 relative to the direction of transport of the object 130 can be less than or greater than 180°. In some embodiments, the source 150 can emit gamma rays. The detector 160 can be configured to detect measurement data indicative of an interaction of the x-ray radiation with the portion of the object 130. The detector 160 is disposed relative to the x-ray source 150 to detect the measurement data along the scan path 105. In some embodiments, the source 150 and detector 160 can have a fixed spatial relationship and may rotate about a longitudinal axis of the imaging system 100 as, for example, on a gantry. In some embodiments, one or more sources 150 and detectors 160 can be fixed with respect to the transport system 120. In some embodiments, the positions of the x-ray source 150 and detector 160 can be fully known as a function of time during scanning of the object 130.

The computing device 140 includes at least one processing unit 145 including at least one central processing unit (CPU). The computing device 140 can be configured to receive measurement data acquired by the detector 160. The processing unit 145 is programmable to execute processor-executable instructions to generate a high-resolution reconstructed projection image of the object 130 with minimal artifacts as described in greater detail below.

The central processing unit is programmable to compute reconstructed volumetric data representative of a volume of the object 130 by applying at least one iteration of an iterative reconstruction to the measurement data to derive the reconstructed volumetric data. The computing device 140 and the processing unit 145 are discussed in greater detail with respect to FIG. 6.

The computing device 140 including the processing unit 145 can be configured to exchange data, or instructions, or both data and instructions, with at least one of the other components of the imaging system 100 wirelessly or via one or more wires or cables 170. As an example, the computing device 140 including the processing unit 145 can communicate with the x-ray source 150 or the detector 160 to control the operation of each and receive measurement data from the detector 160. The computing device 140 including the processing unit 145 can receive measurement data that is representative of a volume of the object 130 and can be configured or programmed to apply at least one iteration of an iterative reconstruction to the measurement data to derive the reconstructed volumetric data. In some embodiments, the computing device 140 can be configured to receive detector orientation data that correlates to the instantaneous location of the detector 160 with respect to the object 130. Detector orientation data can be provided by location sensors located at or near the source 150, detector 160, or scan path or can be calculated based upon other geometrical quantities of the imaging system 100. In some embodiments, the detector orientation data can be encoded directly into the measurement data.

Output from the detectors 160 can be processed by the processing unit 145 to produce measurement data corresponding to volume information of the object 130. The graphic unit 146 can be configured to display a reconstructed image of the object 130 on the visual display device 142. The graphic unit 146 can render a user interface on the visual display device 142 to allow an operator of the imaging system 100 to interact with the user interface of the computing device 140 with an input device 144. In one embodiment, the user interface is a graphical user interface (GUI). The input device 144 can be a keyboard, a mouse, a trackball, a touchpad, a stylus, a touchscreen of the visual display device 142 or any other suitable device that allows a user to interface with the computing device. In some embodiments, the GUI can be rendered on a touchscreen to allow a user to input information or data.

The imaging chamber 110 may be made of appropriate metal or plastic materials that allow the desired spacing and orientation of the x-ray source 150 and the detector 160 relative to the object 130. In some embodiments, the imaging chamber 110 may include radiation stopping or absorbing material such as lead.

The object 130 to be imaged can enter the imaging chamber 110 through the passageway 122. The size of the passageway 122 may be of any shape that meets application-specific requirements. For example, the passageway 122 may be configured with a passageway sized to allow the transport of hand-carry luggage, checked luggage, cargo, shipping containers, or any other type of object. The passageway 122 may be configured with any geometric conformation. As non-limiting examples, the passageway 122 can have a circular cross-section, a square cross-section, a rectangular cross-section, a hexagonal cross-section, an oval cross-section, or other polygonal-shaped cross-section. In another example, passageway 122 can have an irregularly-shaped cross-section.

The imaging chamber 110 can house one or more x-ray sources 150 and detectors 160. In accordance with various embodiments, the x-ray source 150 may be an x-ray source or a gamma ray source. The x-ray source(s) 150 can be configured to emit a cone-beam of radiation to interact with the object 130, and the detectors 160 can be configured to detect radiation indicative of an interaction of the radiation with any portion of the object. As a non-limiting example, the detector 160 can detect attenuated radiation that has passed through a portion of the object 130. In some embodiments, the x-ray source 150 and detector 160 can move cooperatively along a circular scan path that may be defined relative to the motion of an object 130 to form a helical cone beam. For example, the scan path may be a partial or complete circle of constant radius where the object 130 travels along a line passing through a central portion of the circle. The x-ray source 150 of some embodiments can include a high-energy electron beam and an extended target or array of targets. In some embodiments, imaging systems as taught herein can have more than one source and detector.

In some embodiments, the detector 160 may be configured with multiple detector elements in a detector array.

The processing unit 145 can be configured to generate volumetric data from the radiation detected by the detectors 160 using any suitable image reconstruction methodology. Examples of direct reconstruction techniques that may be used to reconstruct volumetric data in some embodiments include a filtered back-projection methodology, an analytical cone-beam methodology, an approximate cone-beam methodology, a Fourier reconstruction methodology, an extended parallel back-projection methodology, a filtered back-projection methodology, a pi-line-based image reconstruction methodology, a Feldkamp-type reconstruction methodology, a tilted-plane Feldkamp-type reconstruction methodology, or any other direct reconstruction technique that meets application-specific requirements.

Iterative reconstruction techniques may also be employed in the system 100 to reconstruct volumetric data. Examples of iterative reconstruction techniques include a simultaneous algebraic reconstruction technique (SART), a simultaneous iterative reconstruction technique (SIRT), an ordered subset convex technique (OSC), ordered subset maximum likelihood methodologies, an ordered subset expectation maximization (OSEM) methodology, an adaptive statistical iterative reconstruction technique (ASIR) methodology, a least squares QR methodology, an expectation maximization (EM) methodology, an OS-separable paraboloidal surrogates technique (OS-SPS), an algebraic reconstruction technique (ART), a Kacsmarz reconstruction technique, or any other iterative reconstruction technique or methodology that meets application-specific requirements. In some embodiments, a sparse matrix or a compressed sensing technique can be used to increase the speed of the reconstruction.

In the implementation of an iterative reconstruction technique, an initial state is defined before successive iterative steps are performed. When initialized using an empty or uniform set, an iterative reconstruction technique may perform many iterations before achieving convergence. Each iteration step is computationally intensive, so conducting many iteration steps can unacceptably increase the total time for data reconstruction. Reducing the numbers of iterations to achieve a solution can greatly increase the speed and efficiency of the image reconstruction computation. In accordance with various embodiments, the process of iterative reconstruction can be initialized using the output from a direct reconstruction technique including, but not limited to, a filtered back-projection methodology. The use of output from a direct reconstruction technique can significantly reduce the number of iterations to reach convergence and speed up total processing time.

Similarly, the use of a large number of voxels can improve the resolution of the resulting volumetric dataset, but it can also increase the computation time for each iteration. In accordance with various embodiments, a reconstructed first volumetric dataset can be computed having first voxel dimensions. In some embodiments, the first voxel dimensions can correspond to coarse voxels that can be computed quickly using a direct or iterative reconstruction process. As described in greater detail below, the first volumetric dataset can also be initialized to contain set values such as zeroes or constant values corresponding to uniform materials such as air or water. The first volumetric dataset can act as an initialized input into the iterative reconstruction technique and can be resampled to produce a reconstructed second volumetric dataset having second voxel dimensions. In some embodiments, the second voxel dimensions can be smaller than the first voxel dimensions to provide improved image resolution. The first voxel dimensions or second voxel dimensions can produce voxels that are square (i.e., the first voxel dimensions are all equal) or rectangular (e.g., at least one of the three voxel dimensions can be different than another). In some embodiments, the first volumetric dataset can be input into an iterative reconstruction technique to produce the second volumetric dataset as an output to the technique.

In accordance with various embodiments, measurements obtained from a detector 160 may be used by the processing unit 145 to reconstruct a three-dimensional (i.e., volumetric) representation of properties of the object 130. The volumetric dataset can represent one or more properties of the object 130 being imaged, which may be under inspection to identify contraband. For example, the radiation emitted by the x-ray source 150 may attenuate as it passes through a portion of the object 130 before impinging on a detector 150. This attenuation is proportional to the density of the portion of the object 130 through which it traveled. Accordingly, the volumetric dataset can represent information about the density of the portion of the object. In another embodiment, radiation at two different energy levels may be directed such that they pass through a portion of the object 130. The ratio of the attenuation between beams at two different energy levels can provide information about the atomic number or elemental composition of the portion of the object 130. The system 100 according to the principles taught herein may be configured to compute volumetric data corresponding to the density, or atomic number, or both density and atomic number properties, of a portion of the volume of the object 130. In various embodiments, measurement data or reconstructed images or representations may be stored and retrieved for analysis at a later date or may be displayed to a user on the visual display device 142. In some embodiments, the measurement data collected at the detector 150 may be interpolated onto a virtual array or interpolation may be used to modify or replace data values associated with malfunctioning or missing detector positions.

Figure 2A:
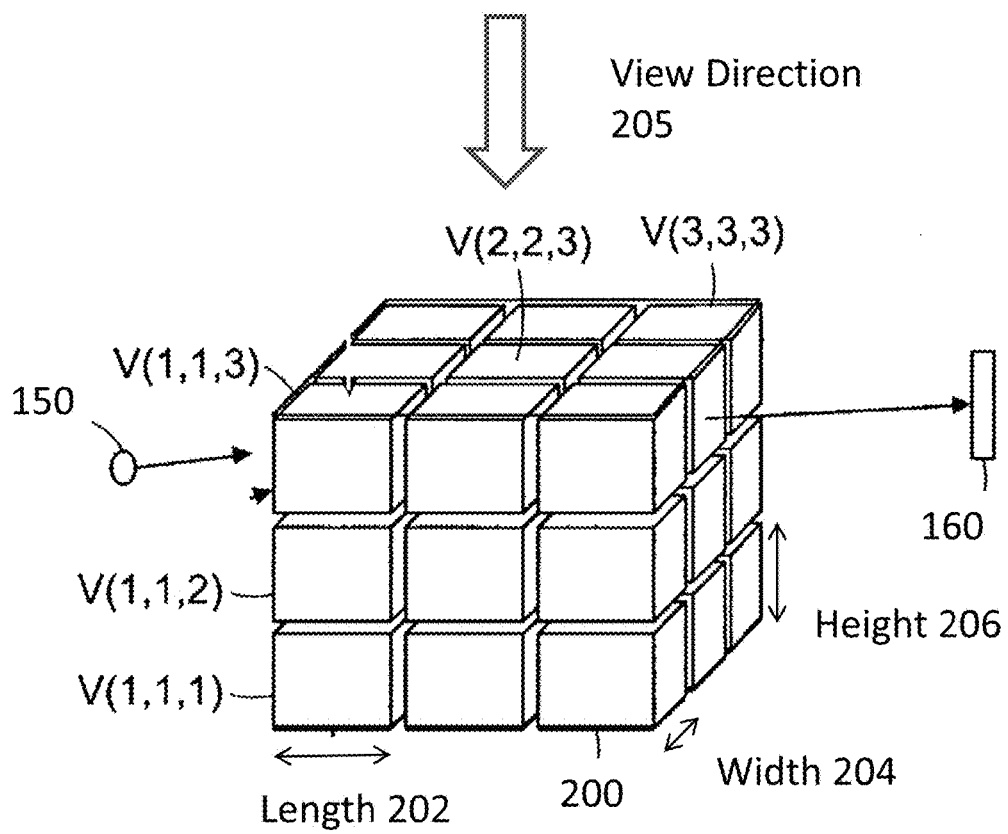
FIG. 2A illustrates an exemplary three-dimensional representation of a reconstruction geometry, according to embodiments of the present disclosure.

FIG. 2A illustrates a three-dimensional representation of the object 130 as a first volumetric dataset of voxels 200. In some embodiments, the first volumetric dataset can be organized as a first array of voxels. The object 130 is represented in FIG. 2A by a first volumetric dataset of twenty-seven voxels 200 whereas the object 130 in an actual reconstruction would be represented by a much larger number of voxels 200. The voxels 200 have voxel dimensions including a length 202, width 204, and height 206. In this example, the voxels 200 are squares, but it will be apparent to those of ordinary skill in the art that the voxels can be rectangular or can be defined in a non-Cartesian coordinate system.

In FIG. 2A, several voxels are numbered (i.e., V(1,1,1), V(1,1,2), V(1,1,3), V(2,2,3), and V(3,3,3)). Rays emanate from the x-ray source 150 and pass through the object 130 represented by the voxels 200 before striking the detector 160. In the present disclosure, volumetric image reconstruction is used to compute a volumetric dataset including values of a material property such as mass density or atomic number for each of the voxels based on the measurement outputs from detectors. In some embodiments, the reconstruction can be used to determine an average value of one or more material properties within each voxel. For example, the average material property can be density, atomic number, or both density and atomic number. As taught herein, the object 130 may be represented in some embodiments by the first volumetric dataset of voxels 200 with each voxel having first voxel dimensions 202, 204, 206 during an initial stage of volumetric data reconstruction and, at a later stage of volumetric data reconstruction, may be represented by a second volumetric dataset of voxels 220 with each voxel having second voxel dimensions 222, 224, 226. In some embodiments, the first volumetric dataset can be initialized using values received from prior reconstruction efforts. In accordance with various embodiments, the first volumetric dataset can be initialized by setting all or a portion of the data values to 0 or to a constant number that represents the density of a material such as air, water, metals, fabrics, or any other suitable material. The first volumetric dataset may also be calculated from the measurement data using the processing unit 145 as described above. The second volumetric dataset is discussed in greater detail below with reference to FIGS. 2C and 2E. In some embodiments, the second volumetric dataset can be organized as a second array of voxels. In some embodiments, the voxel dimensions can be chosen to improve computational throughput when computing a volumetric dataset.

In accordance with various embodiments, a projection image can be generated from the first or second reconstructed volumetric dataset. The projection image can provide a two-dimensional representation of the volumetric dataset from a particular view direction 205. The projection image can be generated using a variety of view direction reconstruction methodologies. In some embodiments, each pixel of the projection image can be generated by collapsing one dimension of the volumetric dataset by, for example, summing all of the values of a column of voxels along the view direction 205. In some embodiments, each pixel of the projection image can be generated by selecting the maximum value of the volumetric dataset from each column of voxels ordered along the view direction 205. In some embodiments, the view direction reconstruction methodology can interpolate the data in the volumetric dataset to produce columns of voxels oriented along the view direction 205. The two-dimensional projections may include data taken along a slice or slices of the object 130. In some embodiments, each pixel of the projection image is selected from the same slice through the volumetric dataset perpendicular to the view direction 205. A slice of the object 130 can be defined as a two-dimensional array of data where each element of the array has the same value of the longitudinal coordinate (i.e., the coordinate along the direction of transport of the object 130 through the passageway 122). In some embodiments, the orientation of the slice can be defined by the plane in which the scan path 105 lies. The slices may be oriented perpendicular to the direction of motion or along any other dimensions as may be required. View direction reconstruction methodologies as taught herein are not limited to a specific implementation on the processing unit 145 or the computing device 140. One or more view direction reconstruction methodologies as taught herein may be executed by the processing unit 145 using a view direction reconstruction code 427 stored in a storage 424 of the computing device 140, as described in detail below with reference to FIG. 6.

To generate projection images for view directions 205 other than 0° and 90°, several methods can be used. For example, the second volumetric dataset can be reconstructed, and data values along the view direction can be interpolated along the view direction 205. For non-normal view directions, rotation of the coordinate system axes of the volumetric dataset can, in some cases, simplify generation of the projection image. In some embodiments, the coordinate system of the first or second volumetric datasets can be rotated to align with the view direction 205. As non-limiting examples, rotation of the coordinate system of the volumetric dataset can include performing a linear interpolation, a Cartesian-to-polar mapping, or both. The linear interpolation can be performed on the first volumetric dataset or the second volumetric dataset. For example, the second volumetric data set can be reconstructed as described previously herein. Then, the axes of the second volumetric dataset can be rotated using a Cartesian-to-polar mapping and interpolation. The second volumetric dataset can be collapsed along the rotated X or Y coordinate as described previously herein for projection along normal axes such as 0° or 90°. Rotation of the coordinate system axes of the first volumetric dataset to align with the view direction 205 may be advantageous because errors caused by interpolation can subsequently be corrected during reconstruction of the second volumetric dataset. In this case, the second volumetric dataset can be reconstructed in the rotated coordinate system. The projection image can then be generated from the rotated reconstructed volumetric dataset as described above. Rotation of the coordinate system axes of the first volumetric dataset can also enable the use of elongated (i.e., non-square) voxels along the view direction 205 during reconstruction of the second volumetric dataset.

In some embodiments, measurements are made by detecting penetrating radiation after it has passed from the x-ray source 150 through the object 130. In the representational example shown in FIG. 2B, the radiation may be depicted as a ray connecting the x-ray source 150 and one or more locations of detector(s) 160. A comparison between the measured intensity when the object 130 is present and the expected intensity without the object 130 present produces an attenuation value corresponding to the path taken by that ray. A proportionate weight can be assigned to each pixel along the ray's path equal to the length of the path line within the pixel compared to the total length of the ray path. When the attenuation values for a sufficient number of rays at a sufficient number of angles are obtained, the attenuation data can be processed to compute a material property for each pixel.

Figure 2B:
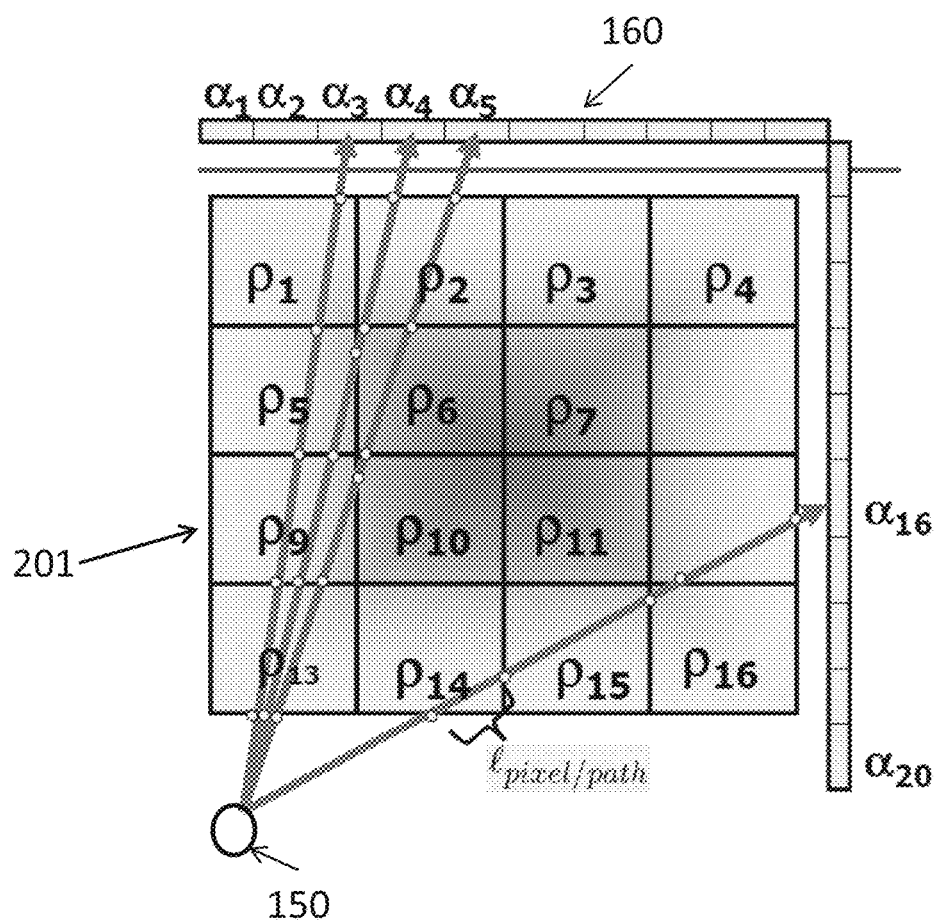
FIG. 2B illustrates an exemplary two-dimensional representation of a reconstruction geometry, according to embodiments of the present disclosure.

For example, FIG. 2B illustrates the x-ray source 150 and several positions of the detector 160. A ray traveling from the x-ray source 150 to the detector 160 at position $\alpha_5$ passes through pixels $\rho_2$, $\rho_6$, $\rho_9$, $\rho_{10}$ and $\rho_{12}$. As a result, the value detected by a detector 160 at location $\alpha_5$ depends on the material properties in each of those pixels. Thus, the measurement taken by the detector 160 at $\alpha_5$ of a ray from the x-ray source 150 may be used as part of an estimate of material properties such as density or atomic number at each of the pixels $\rho_2$, $\rho_6$, $\rho_9$, $\rho_{10}$ and $\rho_{12}$.

The measured outputs of the detector 160 may be used to define a system of simultaneous equations that, using an iterative mathematical technique, may be solved for the unknown values representing the material property of the individual pixels 201 in a slice of the representation of the object 130. Because variations in the measurement process may prevent a single solution from satisfying simultaneously all equations in a system of simultaneous equations, solving the system of equations formed from actual measurements would involve iteratively seeking the values that best solve the equations. Similarly, obtaining measurements from multiple angles allows material properties in each of the pixels 201 representing a slice of the object 130 to be computed using a direct method.

The resolution of the volumetric data representation of the object 130 depends in part on the voxel dimensions and, relatedly, the number of voxels 200 that make up the representation. However, as mentioned previously, the computational overhead in calculating an iterative reconstruction of a volumetric dataset increases as the number of voxels increases. In some embodiments, the exemplary systems, methods, and computer readable media described herein can be used to produce second volumetric datasets having a lower voxel resolution in at least one dimension than the corresponding dimension of the first volumetric dataset. Relaxation of voxel resolution requirements in one or more dimensions can speed up computational performance with respect to iterative reconstruction techniques. In an exemplary embodiment, the second volumetric dataset can have a lower voxel resolution in a dimension along the view direction than the corresponding dimension of the first volumetric dataset. Embodiments wherein the second volumetric dataset has a lower voxel resolution in a dimension along the view direction than the corresponding dimension of the first volumetric dataset may also have greater restriction on the allowable upper bound of the angle of binned x-rays with respect to the view direction. Reduction of the voxel dimension in the dimension along the view direction has little effect on resulting projection image quality for embodiments where the projection image is generated by summing the data or finding the maximum value of the data in the second volumetric dataset along the view direction. In some embodiments, the exemplary systems, methods, and computer readable media described herein can be used to produce the second volumetric dataset having a higher voxel resolution in at least one dimension than the corresponding voxel resolution of the first volumetric dataset.

Figure 2C:
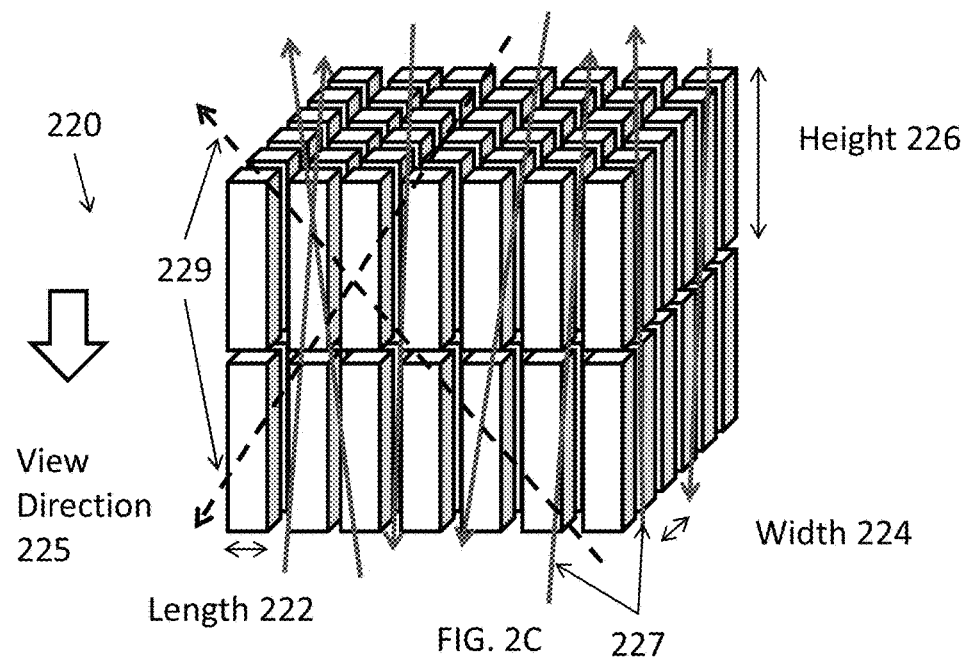
FIG. 2C illustrates an exemplary three-dimensional representation of a reconstruction geometry, according to embodiments of the present disclosure.

In accordance with various embodiments, a second volumetric dataset can be produced using a selected portion or subset of the measurement data corresponding to x-rays that meet a geometrical constraint combined with an initialized first volumetric dataset using an iterative reconstruction technique. FIG. 2C illustrates an exemplary three-dimensional representation of the object 130 as the second volumetric dataset of voxels 220. In this example, the second volumetric dataset of voxels 220 includes an array of eighty-four voxels having voxel dimensions including a length 222, a width 224, and a height 226. In some embodiments, a binning procedure can be performed to create a selected portion of the measurement data for further processing. In a binning process, measurement data corresponding to x-rays that pass through the object on a path substantially parallel to the view direction 225 are identified and selected. For example, paths along a view direction can differ in parallelism by plus or minus five degrees along the view direction 225, or can differ in parallelism by plus or minus four degrees along the view direction 225, or can differ in parallelism by plus or minus three degrees along the view direction 225, or can differ in parallelism by plus or minus two degrees along the view direction 225, or can differ in parallelism by plus or minus one degree along the view direction 225, or can differ in parallelism between zero and one degree along the view direction 225, or any other suitable range of degrees taken along the view direction 225. In some embodiments, measurement data corresponding to x-rays that pass through the object 130 can be selected if the angle of the x-ray path with respect to the view direction 225 is within an upper bound, for example, 90 degrees, 45 degrees, 15 degrees, 5 degrees, or any other suitable bound as necessary for a particular application.

Although use of a narrow band or range of angles close to the view direction can provide maximum reduction of the effect of artifacts, sampling limitations can produce locations in the image where the source/detector alignment produces minimal contrast and poor resolution. In such cases, the inclusion of off-axis angle rays traveling through the same region can improve image contrast because the off-axis rays may be acquired at different times and at different positions of the object 130 with respect to the source 150 and the detector 160 as the object 130 travels through the imaging chamber 110. Thus, in some embodiments, a subset of measurement data can be selected corresponding to x-rays traveling at an angle with respect to a second direction different than the view direction 225. The second direction can be at an angle with respect to the view direction 225 such as 5 degrees, 15 degrees, 45 degrees, 90 degrees, or any other suitable angle. Further, measurement data can be selected that corresponds to x-rays traveling within an upper bound (e.g., 90 degrees, 45 degrees, 15 degrees, 5 degrees) with respect to the second direction. In various embodiments, the selected set of measurement data corresponding to x-rays that pass through the object 130 can include measurement data corresponding to x-rays traveling with respect to the view direction 225 and the second direction. For example, the measurement data may be selected corresponding to x-rays that are within 1 degree of the view direction 225 and within 1 degree of the second direction that itself is tilted 5 degrees with respect to the view direction 225. In some embodiments, the measurement data can be selected corresponding to x-rays that are within an upper bound of the second direction and a third direction different than the view direction 225. For example, measurement data can be selected corresponding to x-rays that are within 1 degree of a direction tilted by 5 degrees with respect to the view direction 225 and within 1 degree of a direction tilted by −5 degrees with respect to the view direction 225. Although the view direction, second direction, and third direction are described herein, one of ordinary skill in the art will appreciate that any number of additional directions may be chosen to satisfy the demands of a particular application. Described differently, the selected subset or portion of measurement data corresponding to x-rays that are substantially parallel to the view direction 225 can include two or more non-contiguous subsets of angles.

As shown in the example of FIG. 2C, selected measurement data can correspond to x-rays 227 (solid arrows) that travel along paths substantially parallel to the view direction 225, while excluded measurement data can correspond to x-rays 229 (dashed arrows) that are not substantially parallel to the view direction 225. In accordance with various embodiments, measurement data corresponding to each x-ray may be selected if the x-ray was substantially parallel and either co-propagating or counter-propagating with respect to the view direction 225 The measurement data corresponding to x-rays that were substantially parallel to the view direction 225 can form a selected portion of the measurement data that may be used in further processing, as described in greater detail below. It will be apparent to one of ordinary skill in the art that certain measurement data corresponding to x-rays that would ordinarily be excluded for failing to be substantially parallel to the view direction 225 may nevertheless be included in the selected portion or subset of the measurement data.

In the example of FIG. 2C, the voxel dimensions of length 222, width 224, and height 226 of the second volumetric dataset of voxels 220 are unequal. In accordance with various embodiments, one or more voxel dimensions can be chosen to provide improved resolution in directions perpendicular to the view direction 225. For example, the length 222 and width 224 of a voxel of the second volumetric dataset may be smaller than the corresponding length 202 and width 204 of a voxel of the first volumetric dataset. When the projection image is formed along the view direction 225, the resolution of the volumetric dataset along the view direction 225 can take on reduced importance because that dimension can be eliminated in the formation of the projection image. In accordance with various embodiments, a voxel dimension parallel to the view direction 225 can be increased to improve the iteration speed of the computation.

For example, the height 226 of the voxels of the second volumetric dataset may be larger than the corresponding height 206 of the voxels of the first volumetric dataset. In embodiments where the voxel dimension of each voxel in the second volumetric dataset along the view dimension is larger than the corresponding voxel dimension of each voxel in the first volumetric dataset, it may be desirable to use a small upper bound for the angle of the x-ray path with respect to the view direction 225 to reduce data error.

Figure 2D:
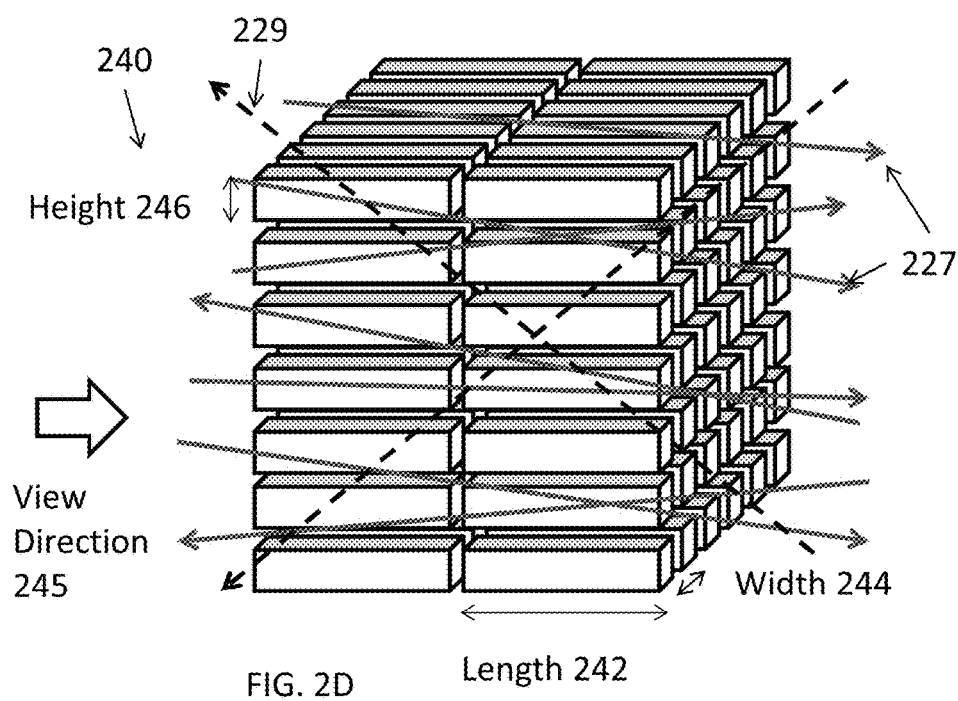
FIG. 2D illustrates an exemplary three-dimensional representation of a reconstruction geometry, according to embodiments of the present disclosure.

FIG. 2D illustrates an exemplary three-dimensional representation of the object 130 as a second volumetric dataset having a rotated array of voxels 240. In this example, the rotated array includes eighty-four voxels with each voxel having voxel dimensions including a length 242, a width 244, and a height 246. In the example shown in FIG. 2D, the view direction 245 is oriented at 90° with respect to the view direction 225 of FIG. 2C. However, it will be apparent to one of ordinary skill in the art that the view direction 245 may be oriented at any angle with respect to the view direction 225. The rotated array of voxels 240 may represent the second volumetric dataset in various embodiments of the present disclosure. In some embodiments, the second volumetric dataset having a rotated array of voxels 240 may be used in place of the second volumetric dataset of voxels 220. In some embodiments, the binning procedure can be performed to create a selected portion of the measurement data for further processing. In the binning process, measurement data corresponding to x-rays that pass through the object 130 on a path substantially parallel to the view direction 245 are identified and selected. For example, paths along a view direction can differ in parallelism by plus or minus five degrees along the view direction 245, or can differ in parallelism by plus or minus four degrees along the view direction 245, or can differ in parallelism by plus or minus three degrees along the view direction 245, or can differ in parallelism by plus or minus two degrees along the view direction 245, or can differ in parallelism by plus or minus one degree along the view direction 245, or can differ in parallelism between zero and one degree along the view direction 245, or any other suitable range of degrees taken along the view direction 245. In some embodiments, measurement data corresponding to x-rays that pass through the object 130 can be selected if the angle of the x-ray path with respect to the view direction 245 is within an upper bound, for example, 90 degrees, 45 degrees, 15 degrees, 5 degrees, or any other suitable bound as desired for a particular application.

Although use of a narrow band (i.e., range) of angles close to the view direction can provide maximum reduction of the effect of artifacts, sampling limitations can produce locations in the image where the source/detector alignment produces minimal contrast and poor resolution. In such cases, the inclusion of off-axis angle rays traveling through the same region can improve image contrast because the off-axis rays may be acquired at different times and at different positions of the object 130 with respect to the source 150 and the detector 160 as the object 130 travels through the imaging chamber 110. Thus, in some embodiments, a subset of measurement data can be selected corresponding to x-rays traveling at an angle with respect to a second direction different than the view direction 245. The second direction can be at an angle with respect to the view direction 245 such as 5 degrees, 15 degrees, 45 degrees, 90 degrees, or any other suitable angle. Further, measurement data can be selected that corresponds to x-rays traveling within an upper bound (e.g., 90 degrees, 45 degrees, 15 degrees, 5 degrees) with respect to the second direction. In various embodiments, the selected set of measurement data corresponding to x-rays that pass through the object 130 can include measurement data corresponding to x-rays traveling with respect to the view direction 245 and the second direction. For example, the measurement data may be selected corresponding to x-rays that are within 1 degree of the view direction 245 and within 1 degree of the second direction that itself is tilted 5 degrees with respect to the view direction 245. In some embodiments, the measurement data can be selected corresponding to x-rays that are within an upper bound of the second direction and a third direction different than the view direction 245. For example, measurement data can be selected corresponding to x-rays that are within 1 degree of a direction tilted by 5 degrees with respect to the view direction 245 and within 1 degree of a direction tilted by −5 degrees with respect to the view direction 245. Although the view direction, second direction, and third direction are described herein, one of ordinary skill in the art will appreciate that any number of additional directions may be chosen to satisfy the demands of a particular application. Described differently, the selected subset or portion of measurement data corresponding to x-rays that are substantially parallel to the view direction 245 can include two or more non-contiguous subsets of angles.

To improve computational speed or reduce noise, information from a first projection image along a first view direction may be used during generation of a second projection image along a second view direction. For example, the first projection image can establish one or more areas that lie outside the boundaries of an object 130 perpendicular to the first view direction, and corresponding values of the volumetric dataset can be set to zero during future data reconstruction operations to improve computation time.

In accordance with various embodiments, the reconstructed second volumetric dataset can be generated directly using the selected portion measurement data and a generic first volumetric dataset (e.g., a data set initialized with zeroes or a constant value). In some embodiments, use of a generic first volumetric dataset can generate lower latency projection images by bypassing the wait associated with the reconstruction process to produce the reconstructed first volumetric dataset.

As shown in FIG. 2D, selected measurement data can correspond to x-rays 227 (solid arrows) that travel along paths substantially parallel to the view direction 245, while excluded measurement data can correspond to x-rays 229 (dashed arrows) that are not substantially parallel to the view direction 245. In accordance with various embodiments, measurement data corresponding to each x-ray may be selected if the x-ray was substantially parallel and either co-propagating or counter-propagating with respect to the view direction 245. The measurement data corresponding to x-rays that were substantially parallel to the view direction 245 can form a selected portion of the measurement data that may be used in further processing as described in greater detail below. It will be apparent to one of ordinary skill in the art that certain measurement data corresponding to x-rays that would ordinarily be excluded for failing to be substantially parallel to the view direction 245 may nevertheless be included in the selected portion of the measurement data.

As taught herein, selection of measurement data that corresponds to x-rays that are substantially parallel to the view direction 225, 245 can be performed in several different ways. In accordance with various embodiments, measurement data from the detector array 160 having $M_{columns} \times$ $N_{rows}$ of pixels may be selected at each position along the scan path 105. The selected data can include data from $N_n$ rows of pixels in column $M_0$ that is closest to being directly opposite the source 150. For example, the column $M_0$ can be calculated by identifying the column among all $M_{columns}$ that is the minimum distance from the source. In other words, if the x-ray focal spot from the source 150 is at a location (X,Y), the column $M_0$ of detector elements can be selected that has the same value of X (i.e., directly above or below the source) for a vertical (i.e., 0° view direction 225) projection and the same value of Y for the horizontal (i.e., 90° view direction 245) projection. To generate projection images along other view directions, calculation of the column $M_0$ at the minimum distance from the source 150 can be performed in a rotated coordinate frame. In some embodiments, additional columns to either side of $M_0$ can be selected to widen the allowed angular range.

In some embodiments, measurement data corresponding to x-rays that were substantially parallel to the view direction 225, 245 can be performed by computing a two-dimensional ray vector between the source 150 and columns $M_{columns}$ of the detector array 160 and selecting data from all columns within a given threshold angle with respect to the view direction 225, 245. In some embodiments, a three-dimensional ray vector can be computed between the source 150 and columns $M_{columns}$ of the detector array 160 and data can be selected from all columns within a given threshold angle with respect to the view direction 225, 245.

Figure 2E:
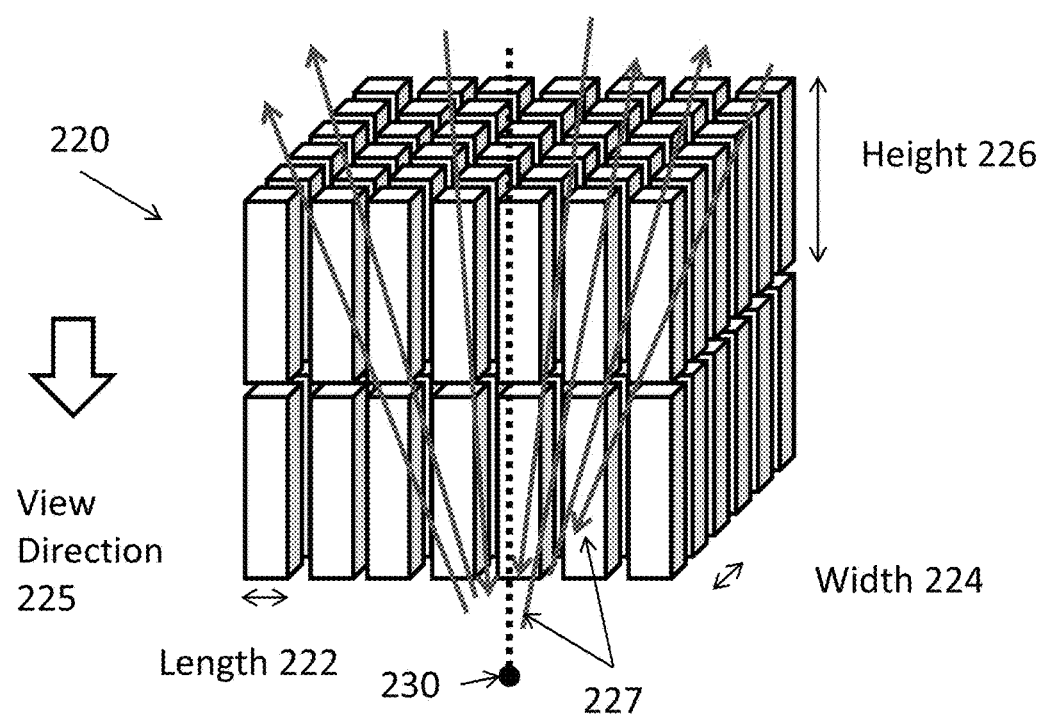
FIG. 2E illustrates an exemplary three-dimensional representation of a reconstruction geometry, according to various embodiments of the present disclosure.

FIG. 2E illustrates an exemplary three-dimensional representation of the object 130 as the second volumetric dataset 220 similar to the depiction above in FIG. 2C. In the embodiment of FIG. 2E, measurement data are selected corresponding to x-rays 227 that are substantially parallel to the view direction 225 and also pass through a fixed point 230. In some embodiments, the fixed point 230 can be located at the position of the x-ray source 150 during at least one moment in time during generation of the measurement data. In accordance with various embodiments, the projection image resulting from the reconstructed second volumetric dataset corresponding to this selected portion of the measurement data can be a perspective image while the projection image resulting from the reconstructed second volumetric dataset corresponding to the selected portion of the measurement data depicted in FIG. 2C can be orthographic. Perspective images as generated herein using the selected portion of the measurement data shown in FIG. 2E can contain a vanishing point and have different object magnification values as a function of distance from object to detector. Orthographic images as generated herein using the selected portion of the measurement data shown in FIG. 2C may not contain a vanishing point and may have a single magnification for all object distances relative to the detector.

Providing additional measurement data corresponding to specific x-ray paths to an iterative reconstruction technique that is in the process of reconstructing a volumetric dataset can have several general effects. Providing additional measurement data corresponding to specific x-ray paths can improve the total estimate of attenuation precisely along the path of each x-ray that generated the additional measurement data. Further, providing additional measurement data corresponding to specific x-ray paths can improve image resolution in dimensions transverse to the path of the x-ray that generated the measurement data. Still further, providing additional measurement data corresponding to specific x-ray paths can maintain or worsen the image resolution along the dimension parallel to the path of the x-ray that generated the measurement data. In accordance with the exemplary systems, methods, and computer readable media described herein, a summation-based or maxima-based projection image generated from a volumetric dataset can be improved by performing algebraic reconstruction using the selected portion of measurement data corresponding to x-rays that are substantially parallel to the view direction prior to collapse of the volumetric dataset (e.g., by summing or finding the maximum).

In various embodiments, a system of simultaneous equations can be defined using all of the measurement data acquired from the detectors or can be defined using a selected portion of the measurement data. The selected portion or subset of measurement data can be chosen based on whether the data is generated by detection of an x-ray that satisfies a geometrical condition such as, but not limited to, being substantially parallel to the view direction 205. In some embodiments, the selected portion of measurement data includes data generated by detection of x-rays that pass through the object 130 at an angle with respect to the view direction 205 of the projection image or another direction with respect to the view direction 205 of less than 90 degrees, less than 45 degrees, less than 15 degrees, less than 5 degrees, or less than any other angle relative to the specified axis. To be identified and included in the selected portion of the measurement data, an x-ray can be traveling substantially parallel and either co-propagating or counter-propagating with respect to the view direction 205.

Embodiments of the present disclosure are distinct from conventional "multi-scale" reconstruction schemes that quickly generate an initial coarse preview image and then subsequently apply additional computational resources to the reconstruction of the volumetric image at finer resolution using the full set of measurement data. Techniques taught herein can benefit from resampling and binning techniques to generate high-quality projection images from a volumetric dataset by using only a portion or subset of the measurement data that satisfies a geometrical condition. The techniques taught herein advantageously reduce artifacts and improve resolution in generated projection images and can, in some embodiments, reduce computational overhead in the generation of multiple projection images at different angles.

Measurement data that is used with a data reconstruction methodology of the present application may be from a classically complete measurement or a measurement that may fail to be classically complete. As used herein, the term "classically-complete" refers to a source-detector geometry that provides complete pi-line coverage (or band-limited coverage in some examples) at a given speed of transport of an object, enabling analytic inversion of the projection measurements. An example discussion of classically-complete geometry is provided in, for example, Y. Ye et al., "Minimum detection windows, PI-line existence and uniqueness for helical cone-beam scanning of variable pitch." Medical physics 31.3 (2004): 566-572. In accordance with various embodiments, the present methods, systems, and computer readable media can advantageously be used to generate projection images from measurement data that is acquired under conditions of pi-line incompleteness. In particular, the selected portion of the measurement data may be chosen to increase the influence of limited or incomplete data representing x-rays that are substantially parallel to the view direction for a portion of the object during data reconstruction. In accordance with various embodiments, the methods, systems, and computer-readable media of the present disclosure may reduce the effect of artifacts the can arise during generation of a projection image based on measurement data that is not classically-complete.

Certain materials such as metals present in the object 130 being imaged can cause errors or artifacts in the reconstructed volumetric dataset and projection images calculated using direct or iterative reconstruction techniques. Because of the high density and atomic number of these materials, x-rays can be blocked or scattered and can be undetected, or detected by the wrong detector element (i.e., a detector element not in line with the original path of the x-ray beam). The resulting effect creates inconsistencies that are spread throughout the entire volumetric dataset. Imaging artifacts created by these materials can affect data quality and image contrast and can obscure the presence of items in the object 130 such as contraband.

As described above, the system of simultaneous equations can be defined using all of the measurement data acquired from the detectors or using a selected portion of the measurement data. The selected portion of measurement data can be chosen based on whether the data was generated by detection of an x-ray that satisfies a geometrical condition. In some embodiments, the selected portion of measurement data includes data generated by detection of x-rays that pass through the object 130 at an angle with respect to the view direction 205 of the projection image or another direction with respect to the view direction 205 of less than 90 degrees, less than 45 degrees, less than 15 degrees, less than 5 degrees, or less than any other angle relative to the specified axis. The use of a selected portion of measurement data to define the system of simultaneous equations can limit artifacts and reduce degradation of the projection image caused by the presence of high-density or high atomic number materials in embodiments where the projection image is generated by summing the data or finding the maximum value of the data in the second volumetric dataset along the view direction. The use of a selected portion of measurement data rather than all of the measurement data can cause imaging artifacts to be preferentially generated along the view direction in the second volumetric dataset. These artifacts can then be subsequently eliminated when the projection image is generated. Thus, the inconsistencies may still be present in the reconstructed volumetric dataset, but are not visible in generated projection images. Although data inconsistencies may create errors in measurements of absolute (i.e., total) attenuation along the rays, the generated projections images are often qualitative in nature and may not be impacted by such errors. In some embodiments, increasing the upper bound of the angle of the x-ray path with respect to the view direction that is to be included in the selected portion of the measurement data can contribute to reduction of artifacts in the final image.

FIGS. 3 and 4 represent alternative methodologies for generating a reconstructed projection image of an object in accordance with embodiments as taught herein. In the methodology depicted in FIG. 3, the first volumetric dataset can be received or provided having a plurality of voxels with first voxel dimensions. In the methodology depicted in FIG. 4, the reconstructed first volumetric dataset can be computed from the measurement data using at least one processing unit.

A flow chart representing a two-dimensional data reconstruction methodology 300 according to various embodiments of the present disclosure is presented in FIG. 3. FIG. 3 is described in greater detail below in relation to FIGS. 1-2E and 6. Code for one or more portions of the below-described steps may be included in a direct reconstruction code 424, an iterative reconstruction code 425, or a view direction reconstruction code 427.

In step 301, measurement data representative of an interaction of x-rays with at least a portion of an object is received using at least one processing unit. For example, the processing unit 145 can receive from the detector 160 measurement data representative of an interaction of an x-ray beam from the electromagnetic radiation source 150 with at least a portion of the object 130 as shown above with reference to the imaging system 100 of FIG. 1. In some embodiments, the measurement data can be retrieved from a computer memory 406 or database 426 associated with the computing device 140 as will be described below in greater detail with reference to FIG. 6. In accordance with various embodiments, all or a portion of the measurement data can be identical to or different from the measurement data used in a preceding, concurrent, or subsequent three-dimensional or two-dimensional data reconstruction methodology.

In step 303, a first volumetric dataset having a plurality of voxels with first voxel dimensions is received by at least one processing unit. For example, values of the first volumetric dataset set can be estimated at least in part by observing the exterior of an object 130 using an array of cameras. Alternatively, data in the first volumetric dataset can be initialized using the results of a previous reconstruction operation or can be initialized to a uniform value representative of air, vacuum, water, lead or other metals, or any other suitable material.

In step 305, a portion of the measurement data corresponding to data obtained from x-rays that are substantially parallel to a view direction of a projection image of the portion of the object can be selected using the at least one processing unit. For example, the processing unit 145 can select a portion of the measurement data corresponding to data obtained from x-rays 227 that are substantially parallel to a view direction 225 of a projection image of the portion of the object 130 as described above with reference to FIG. 2C. As described herein, the view direction 225 can be any angle with respect to a specified axis of the object, such as but not limited to, 90 degrees, 45 degrees, 15 degrees, 5 degrees, or any other angle relative to the specified axis. As described above, the view direction reconstruction technique can be used to identify and select measurement data corresponding to x-rays 227 that were substantially parallel to the view direction 225.

In step 307, a reconstructed second volumetric dataset having second voxel dimensions is computed using the first volumetric dataset and the selected portion of the measurement data by using the at least one processing unit. For example, the processing unit 145 can compute a reconstructed second volumetric dataset of voxels 220 having a plurality of voxels with second voxel dimensions 222, 224, 226 using the first volumetric dataset 200 and the selected portion of the measurement data as described above with reference to FIG. 2C. In accordance with various embodiments, the second volumetric dataset 220 having second voxel dimensions 222, 224, 226 can be resampled from the first volumetric dataset 200. To compute the reconstructed second volumetric dataset 220, the selected portion of the measurement data can be used as an input into a direct or iterative reconstruction technique.

In step 309, the projection image of the portion of the object along the view direction is generated from the reconstructed second volumetric dataset using a graphic unit. For example, a graphic unit 146 can generate the projection image of the portion of the object 130 along the view direction 225 from the reconstructed second volumetric dataset 220 as described above with reference to FIG. 1. The graphic unit 146 may generate the projection image of the portion of the object 130 by summing the values in each column of the second volumetric dataset along the view direction 225 or by finding the maxima in each column along the view direction. In some embodiments, the graphic unit 146 can generate the projection image of the portion of the object 130 by selecting a slice from the second volumetric dataset as described previously. In some embodiments, the projection image generated by the graphic unit 146 can be displayed on a visual display device 142 or can be saved to a memory 406 or database 426 of a computing device 140 as described in greater detail below with reference to FIG. 6.

In some embodiments, the methodology 300 may be performed multiple times to generate projection images for multiple view directions. In such embodiments, the multiple performances of the methodology 300 can be performed in series or in parallel and may or may not share some steps in common. One of ordinary skill in the art will recognize that any number of two-dimensional data reconstruction methodologies 300 may be performed as necessary to meet application-specific requirements.

A flow chart representing a two-dimensional data reconstruction methodology 400 according to various embodiments of the present disclosure is presented in FIG. 4. FIG. 4 is described in greater detail below in relation to FIGS. 1-2E and 6. Code for one or more portions of the below-described steps may be included in a direct reconstruction code 424, an iterative reconstruction code 425, or a view direction reconstruction code 427.

In step 401, measurement data representative of an interaction of x-rays with at least a portion of an object is received using at least one processing unit. For example, the processing unit 145 can receive from the detector 160 measurement data representative of an interaction of an x-ray beam from the electromagnetic radiation source 150 with at least a portion of the object 130 as shown above with reference to the imaging system 100 of FIG. 1. In some embodiments, the measurement data, can be retrieved from a computer memory 406 or database 426 associated with the computing device 140 as will be described below in greater detail with reference to FIG. 6. In accordance with various embodiments, all or a portion of the measurement data can be identical to or different from the measurement data used in a preceding, concurrent, or subsequent three-dimensional or two-dimensional data reconstruction methodology.

In step 403, a reconstructed first volumetric dataset having a plurality of voxels with first voxel dimensions is computed from the measurement data using the at least one processing unit. For example, the processing unit 145 can compute a reconstructed first volumetric dataset of voxels 200 having first voxel dimensions 202, 204, 206 from the measurement data as described above with reference to FIG. 2A. The first voxel dimensions 202, 204, 206 can be selected to balance computational demands and desired resolution as described above with reference to FIGS. 2A and 2B. The reconstructed first volumetric dataset can be computed using direct or iterative reconstruction techniques as described previously.

In step 405, a portion of the measurement data corresponding to data obtained from x-rays that are substantially parallel to a view direction of a projection image of the portion of the object can be selected using the at least one processing unit. For example, the processing unit 145 can select a portion of the measurement data corresponding to data obtained from x-rays 227 that are substantially parallel to a view direction 225 of a projection image of the portion of the object 130 as described above with reference to FIG. 2C. As described herein, the view direction 225 can be any angle with respect to a specified axis of the object, such as but not limited to, 90 degrees, 45 degrees, 15 degrees, 5 degrees, or any other angle relative to the specified axis. As described above, the view direction reconstruction technique can be used to identify and select measurement data corresponding to x-rays 227 that were substantially parallel to the view direction 225.

In step 407, a reconstructed second volumetric dataset having second voxel dimensions using the reconstructed first volumetric dataset and the selected portion of the measurement data is computed using the at least one processing unit. For example, the processing unit 145 can compute a reconstructed second volumetric dataset of voxels 220 having a plurality of voxels with second voxel dimensions 222, 224, 226 using the reconstructed first volumetric dataset 200 and the selected portion of the measurement data as described above with reference to FIG. 2C. In accordance with various embodiments, the second volumetric dataset 220 having second voxel dimensions 222, 224, 226 can be resampled from the first volumetric dataset 200. To compute the reconstructed second volumetric dataset 220, the selected portion of the measurement data can be used as an input into a direct or iterative reconstruction technique.

In step 409, the projection image of the portion of the object along the view direction is generated from the reconstructed second volumetric dataset using a graphic unit. For example, a graphic unit 146 can generate the projection image of the portion of the object 130 along the view direction 225 from the reconstructed second volumetric dataset 220 as described above with reference to FIG. 1. The graphic unit 146 may generate the projection image of the portion of the object 130 by summing the values in each column of the second volumetric dataset along the view direction 225 or by finding the maxima in each column along the view direction. In some embodiments, the graphic unit 146 can generate the projection image of the portion of the object 130 by selecting a slice from the second volumetric dataset as described previously. In some embodiments, the projection image generated by the graphic unit 146 can be displayed on a visual display device 142 or can be saved to a memory 406 or database 426 of a computing device 140 as described in greater detail below with reference to FIG. 6.

In some embodiments, the methodology 400 may be performed multiple times to generate projection images for multiple view directions. In such embodiments, the multiple performances of the methodology 400 can be performed in series or in parallel and may or may not share some steps in common. One of ordinary skill in the art will recognize that any number of two-dimensional data reconstruction methodologies 400 may be performed as necessary to meet application-specific requirements.

Figure 5A:
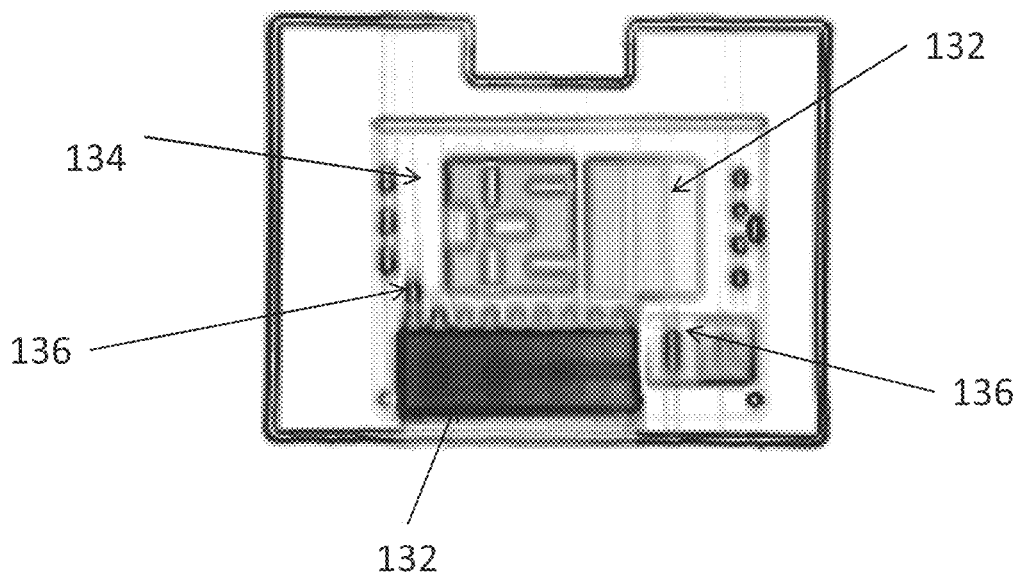
FIG. 5A illustrates a reconstructed projection image of a test piece with pixel dimensions of 2 mm generated using a conventional method.
Figure 5B:
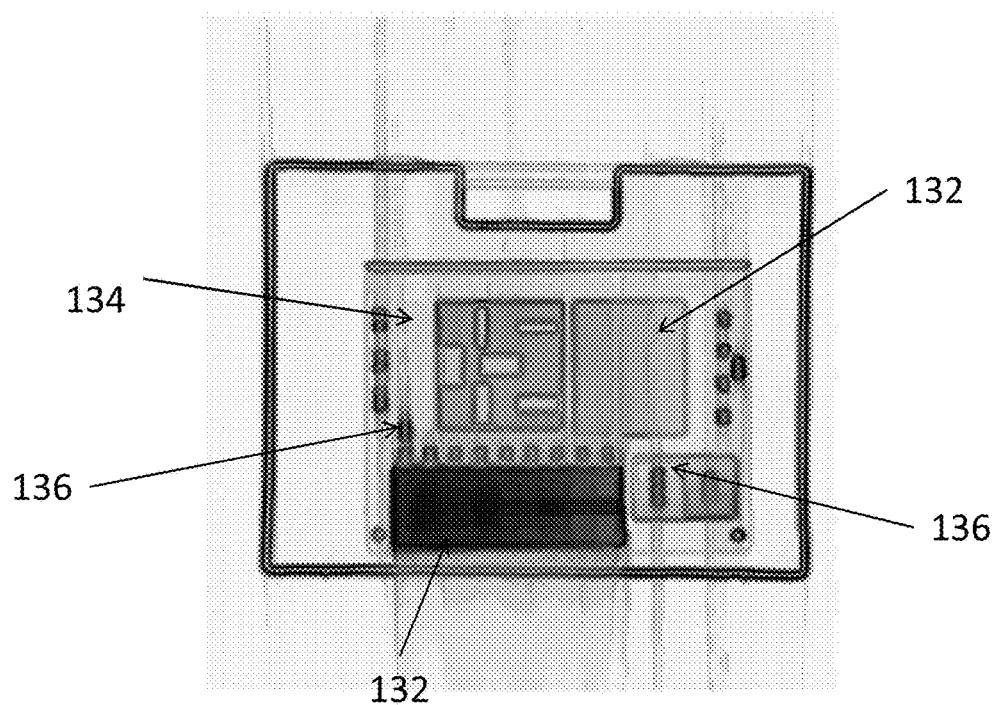
FIG. 5B illustrates a reconstructed projection image of the test piece resampled at a higher resolution with pixel dimensions of 1 mm in accordance with various embodiments of the present invention.
Figure 5C:
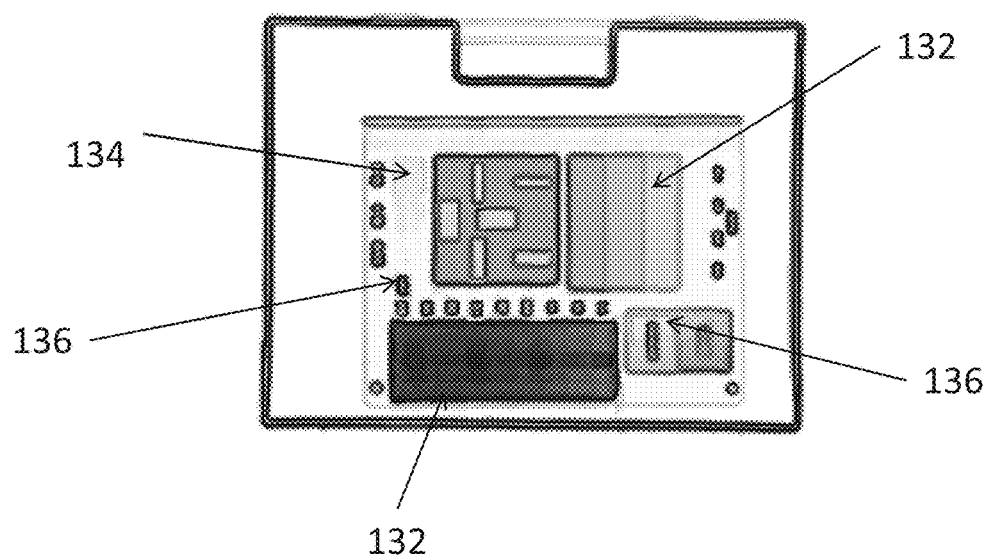
FIG. 5C illustrates a reconstructed projection image of the test piece resampled at a higher resolution with pixel dimensions of 1 mm and iteratively generated using a portion of the measurement data corresponding to data obtained from x-rays that are substantially parallel to the view direction of the projection image in accordance with various embodiments of the present invention.

To evaluate the improvements taught herein, a system as taught herein was used to generate projection images of the test object 130 that includes several elements such as metal step wedges 132 that typically present challenges to image reconstruction using computed tomography. The test object 130 was scanned by the imaging system 100 using a classically-complete scanning geometry (i.e., data was acquired at least over an angular range of 180°+a where a is the angular spread of the fan beam of the x-ray source 150). The image data was reconstructed with the first volumetric dataset calculating using a filtered back-projection methodology and having cubic, 2-mm voxels. Example projection images reconstructed from the acquired data are shown in FIGS. 5A-5C. Although the images of FIGS. 5A-5C have been filtered using a bi-lateral filter they are representative of the image quality improvement possible in accordance with the teachings herein. In FIG. 5A, the projection image pixel dimension is 2 mm, and the image was generated by summing data values along the view direction. In this image, the metal step wedges 132 lack clarity, some elements (134) are not visible due to artifact noise, and some elements (136) are poorly rendered, lack fine detail, and have low resolution.

The projection image shown in FIG. 5B was generated by resampling the second volumetric dataset to produce a projection image pixel dimension of 1 mm. In this image, the resolution of some features such elements 134 and 136 is improved but artifact noise is still visibly present. The intrinsic resolution of the underlying data in FIGS. 5A and 5B is not high, and thus resampling alone does not provide a remarkable improvement in the quality of the resulting image.

The projection image shown in FIG. 5C was generated using techniques taught herein. Specifically, the first volumetric dataset computed using a filtered back-projection methodology was resampled to create the second volumetric dataset with cubic voxels having dimensions of 1 mm. A portion (subset) of the measurement data was selected from all rows and selected columns of the detector array 160 corresponding to x-rays centered at 0°, −3°, and +3° with respect to the view direction 205. An iterative reconstruction methodology including ordered subset convex techniques was supplied with the portion of the measurement data and the reconstructed second volumetric dataset was generated. The projection image of FIG. 5C was generated by summing data values of the reconstructed second volumetric dataset along the view direction. In this image, streaks and noise due to artifacts are almost completely eliminated. The metal step wedges 132 have clear borders and show improved contrast gradation due to changing thicknesses. Element 134 is visible whereas it had been obscured by noise in the prior images, and fine detail is visible for the first time on elements 136. The line pair resolution is also vastly improved.

Figure 6:
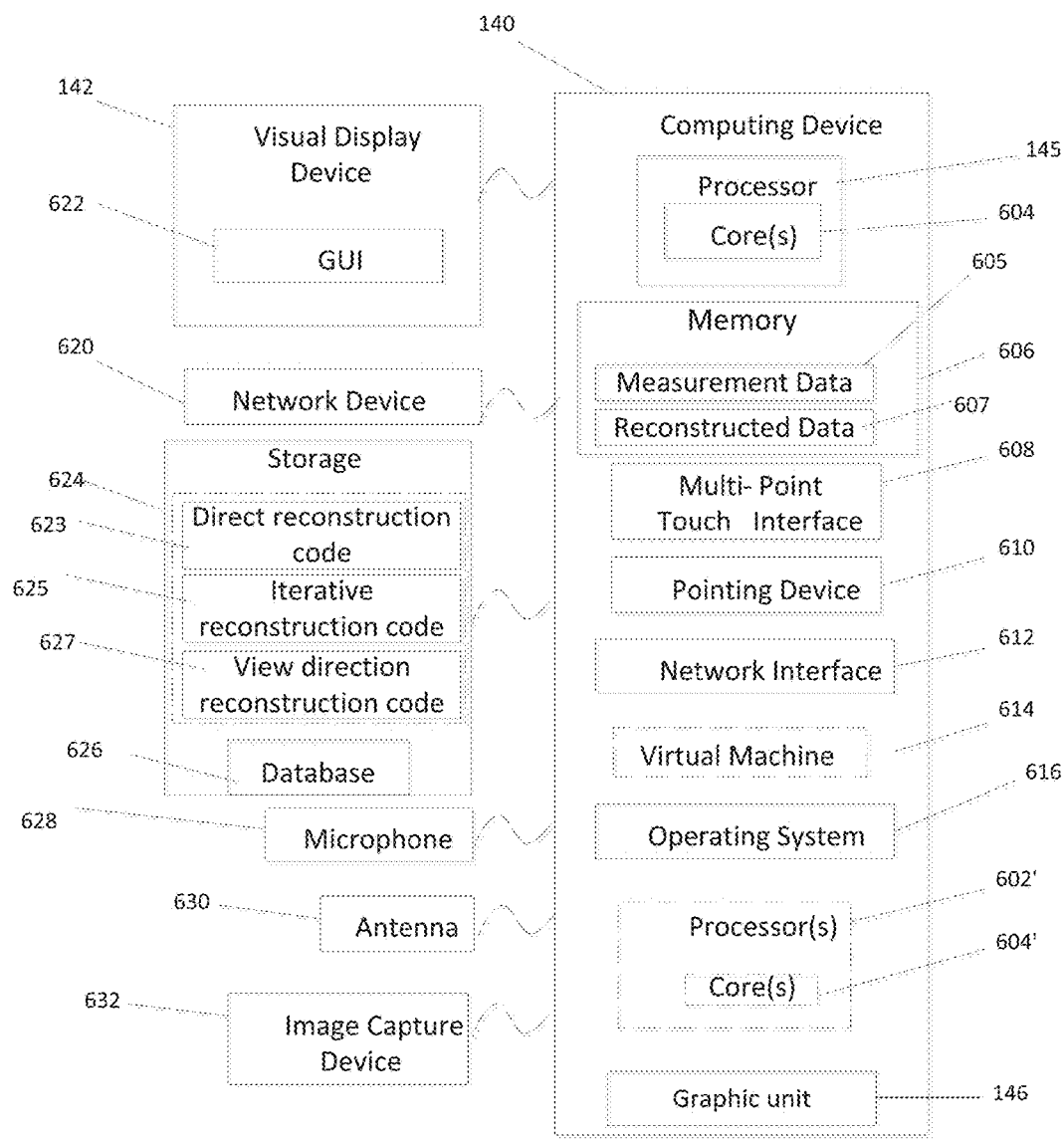
FIG. 6 illustrates an exemplary computing device, according to embodiments of the present disclosure.

FIG. 6 is a block diagram of an exemplary computing device 140 that may be used to implement exemplary embodiments of the image reconstruction methods and systems described herein. Descriptions and elements of the computing device 140 below may be applicable to any computing device described above with reference to previous embodiments. The computing device 140 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 606 included in the computing device 140 may store computer-readable and computer-executable instructions or software for implementing exemplary embodiments of the imaging system 100. The computing device 140 also includes the configurable or programmable processing unit 145 and associated core(s) 604 and may include one or more additional configurable or programmable processor(s) 602' and associated core(s) 604' (for example, in the case of computer systems having multiple processors or cores), for executing computer-readable and computer-executable instructions or software stored in the memory 606 and other programs for controlling system hardware. Processor 145 and processor(s) 602' may each be a single core processor or multiple core (604 and 604') processor.

Virtualization may be employed in the computing device 140 so that infrastructure and resources in the computing device may be shared dynamically. A virtual machine 614 may be provided to handle a process running on multiple processors so that the process appears to be using only one computing resource rather than multiple computing resources. Multiple virtual machines may also be used with one processor.

Memory 606 may include a read-only memory or random access memory, such as DRAM, SRAM, EDO RAM, and the like. Memory 606 may include other types of memory as well, or combinations thereof. In some embodiments, the memory 606 can be used to store measurement data 605 or reconstructed volumetric data 607.

A user may interact with the computing device 140 through the visual display device 142, such as a computer monitor, onto which the graphic unit 146 may display one or more graphical user interfaces 622 provided in accordance with exemplary embodiments. The computing device 140 may include other I/O devices for receiving input from a user, for example, a keyboard or any suitable multi-point touch interface 608, a pointing device 610 (e.g., a mouse), a microphone 628, or an image capturing device 632 (e.g., a camera or scanner). The multi-point touch interface 608 (e.g., keyboard, pin pad, scanner, touch-screen, etc.) and the pointing device 610 (e.g., mouse, stylus pen, etc.) may be coupled to the visual display device 142. The computing device 140 may include other suitable conventional I/O peripherals.

The computing device 140 may also include one or more storage devices 624, such as a hard-drive, CD-ROM, or other computer readable media, for storing data and computer-readable instructions or software that implement exemplary embodiments of the imaging system 100. For example, the storage 624 can store one or more implementations of direct reconstruction executable codes 623, iterative reconstruction executable codes 625, or view direction reconstruction executable codes 627 that are further discussed above in connection with FIG. 1. Exemplary storage device 624 may also store one or more databases for storing any suitable information required to implement exemplary embodiments. For example, exemplary storage device 624 can store one or more databases 626 for storing information, such as transport system speed, items scanned, number of alarm triggers, sensor information, system geometry, x-ray source calibration, time since last system maintenance, lifetime usage, or any other information to be used by embodiments of the system 100. The databases may be updated manually or automatically at any suitable time to add, delete, or update one or more data items in the databases.

The direct reconstruction code 623 includes executable code and other code to cause the processing unit 145 to implement one or more of the direct reconstruction techniques taught herein. The iterative reconstruction code 625 includes executable code and other code to cause the processing unit 145 to perform one or more of the iterative reconstruction methodologies taught herein. The view direction reconstruction code 627 includes executable code and other code to cause the processing unit 145 to perform a view direction reconstruction methodology as taught herein. Although viewed as separate structures in storage 624, one or more of the direct reconstruction code 623, the iterative reconstruction code 625, and the view direction reconstruction code 627 may be implemented as a single module or routine.

The computing device 140 can include a network interface 612 that can be used to transmit or receive data, or communicate with other devices, in any of the exemplary embodiments described herein. Network interface 612 can be configured to interface via one or more network devices 620 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (Wi-Fi, 3G, 4G, Bluetooth®), controller area network (CAN), or some combination of any or all of the above. In exemplary embodiments, the computing device 140 can include one or more antennas 630 to facilitate wireless communication (e.g., via the network interface) between the computing device 140 and a network. The network interface 612 may include a built-in network adapter, network interface card, PCMCIA network card, card bus network adapter, wireless network adapter, USB network adapter, modem or any other device suitable for interfacing the computing device 140 to any type of network capable of communication and performing the operations described herein. Moreover, the computing device 140 may be any computer system, such as a workstation, desktop computer, server, laptop, handheld computer, tablet computer (e.g., the iPad™ tablet computer), mobile computing or communication device (e.g., the iPhone™ communication device), internal corporate devices, or other form of computing or telecommunications device that is capable of communication and that has sufficient processor power and memory capacity to perform the operations described herein.

The computing device 140 may run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 616 may be run in native mode or emulated mode. In an exemplary embodiment, the operating system 616 may be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

The invention claimed is:

1. A method of generating a reconstructed projection image of an object, comprising:
   receiving, using at least one processing unit, measurement data representative of an interaction of x-rays with at least a portion of an object;
   receiving, using the at least one processing unit, a first volumetric dataset having a plurality of voxels with first voxel dimensions;
   selecting, using the at least one processing unit, a portion of the measurement data corresponding to data obtained from x-rays that are substantially parallel to a view direction of a projection image of the portion of the object;
   computing, using the at least one processing unit, a reconstructed second volumetric dataset having a plurality of voxels with second voxel dimensions using the first volumetric dataset and the selected portion of the measurement data; and
   generating, using a graphic unit, the projection image of the portion of the object along the view direction from the reconstructed second volumetric dataset.

2. The method of claim 1, further comprising computing the first volumetric dataset from the measurement data using the at least one processing unit.

3. The method of claim 1, wherein the portion of the measurement data corresponding to x-rays that are substantially parallel to the view direction of the projection image comprises data obtained from x-rays that are at an angle of between 0° and about 45° with respect to the view direction.

4. The method of claim 3, wherein the portion of the measurement data corresponding to x-rays that are substantially parallel to the view direction of the projection image comprises data obtained from x-rays that are at an angle of between 0° and about 15° with respect to the view direction.

5. The method of claim 4, wherein the portion of the measurement data corresponding to x-rays that are substantially parallel to the view direction of the projection image comprises data obtained from x-rays that are at an angle of between 0° and about 5° with respect to the view direction.

6. The method of claim 1, wherein the second voxel dimensions are equal to the first voxel dimensions.

7. The method of claim 1, wherein at least one of the second voxel dimensions is smaller than a corresponding first voxel dimension.

8. The method of claim 1, wherein at least one of the second voxel dimensions is larger than a corresponding first voxel dimension.

9. The method of claim 1, further comprising rotating coordinate axes of the first volumetric dataset or the reconstructed second volumetric dataset to align with the view direction.

10. The method of claim 9, wherein the rotating of coordinate axes of the first volumetric dataset or the reconstructed second volumetric dataset comprises performing a linear interpolation or a Cartesian-to-polar mapping.

11. The method of claim 2, wherein the computing of the first volumetric dataset or the reconstructed second volumetric dataset comprises applying a direct reconstruction technique, or an iterative reconstruction technique, or both.

12. The method of claim 11, wherein the iterative reconstruction technique comprises one or more of a simultaneous algebraic reconstruction technique (SART), a simultaneous iterative reconstruction technique (SIRT), ordered subset convex technique (OSC), an adaptive statistical iterative reconstruction technique (ASIR), an OS-separable paraboloidal surrogates technique (OS-SPS), an algebraic reconstruction technique (ART), or a Kacsmarz reconstruction technique.

13. The method of claim 1, wherein the measurement data represents density of at least the portion of the object.

14. The method of claim 1, wherein the measurement data represents effective atomic number of at least the portion of the object.

15. The method of claim 1, wherein the projection image is an orthographic projection.

16. The method of claim 1, wherein the projection image is a perspective projection.

17. An imaging system, comprising:
an x-ray source to irradiate at least a portion of an object with a beam of x-ray radiation;
a detector array to detect measurement data indicative of an interaction of x-rays with at least the portion of the object;
memory to store processor-executable instructions for a direct reconstruction technique, an iterative reconstruction technique, or both; and
a programmable processing unit having a central processing unit, communicatively coupled to the memory, wherein upon execution of processor-executable instructions, the programmable processing unit operates to:
receive measurement data from the detector array;
receive a first volumetric dataset having a plurality of voxels with first voxel dimensions;
select a portion of the measurement data corresponding to data obtained from x-rays that are substantially parallel to a view direction of a projection image of the portion of the object;
compute a reconstructed second volumetric dataset having a plurality of voxels with second voxel dimensions using the first volumetric dataset and the selected portion of the measurement data; and
cause a graphic unit to generate the projection image of the portion of the object along the view direction from the reconstructed second volumetric dataset.

18. The imaging system of claim 17, wherein the programmable processing unit operates to compute from the measurement data the first volumetric dataset.

19. The imaging system of claim 17, wherein the portion of the measurement data corresponding to x-rays that are substantially parallel to the view direction of the projection image comprises data obtained from x-rays that are at an angle of between 0° and about 45° with respect to the view direction.

20. The imaging system of claim 19, wherein the portion of the measurement data corresponding to x-rays that are substantially parallel to the view direction of the projection image comprises data obtained from x-rays that are at an angle of between 0° and about 15° with respect to the view direction.

21. The imaging system of claim 20, wherein the portion of the measurement data corresponding to x-rays that are substantially parallel to the view direction of the projection image comprises data obtained from x-rays that are at an angle of between 0° and about 5° with respect to the view direction.

22. The imaging system of claim 17, wherein the second voxel dimensions are equal to the first voxel dimensions.

23. The imaging system of claim 17, wherein at least one of the second voxel dimensions is smaller than a corresponding first voxel dimension.

24. The imaging system of claim 17, wherein at least one of the second voxel dimensions is larger than a corresponding first voxel dimension.

25. The imaging system of claim 17, wherein the programmable processing unit further operates to rotate coordinate axes of the first volumetric dataset or the reconstructed second volumetric dataset to align with the view direction.

26. The imaging system of claim 25, wherein the rotating of coordinate axes of the first volumetric dataset or the reconstructed second volumetric dataset comprises performing a linear interpolation or a Cartesian-to-polar mapping.

27. The imaging system of claim 18, wherein the computing of the first volumetric dataset or the reconstructed second volumetric dataset comprises applying a direct reconstruction technique, or an iterative reconstruction technique, or both.

28. The imaging system of claim 27, wherein the iterative reconstruction technique comprises one or more of a simultaneous algebraic reconstruction technique (SART), a simultaneous iterative reconstruction technique (SIRT), ordered subset convex technique (OSC), an adaptive statistical iterative reconstruction technique (ASIR), an OS-separable paraboloidal surrogates technique (OS-SPS), an algebraic reconstruction technique (ART), or a Kacsmarz reconstruction technique.

29. The imaging system of claim 17, wherein the measurement data represents density of at least the portion of the object.

30. The imaging system of claim 17, wherein the measurement data represents effective atomic number of at least the portion of the object.

31. The imaging system of claim 17, wherein the projection image is an orthographic projection.

32. The imaging system of claim 17, wherein the projection image is a perspective projection.

33. A non-transitory machine readable medium storing instructions executable by a processing device having a central processing unit, wherein execution of the instructions causes the processing device to carry out a method for generating a reconstructed projection image of an object, the method comprising:
receiving measurement data representative of an interaction of x-rays with at least a portion of an object;
receiving a first volumetric dataset having a plurality of voxels with first voxel dimensions;
selecting a portion of the measurement data corresponding to data obtained from x-rays that are substantially parallel to a view direction of a projection image of the portion of the object;
computing a reconstructed second volumetric dataset having a plurality of voxels with second voxel dimensions using the first volumetric dataset and the selected portion of the measurement data; and
generating, using a graphic unit, the projection image of the portion of the object along the view direction from the reconstructed second volumetric dataset.

34. The machine readable medium of claim 33, further comprising computing the first volumetric dataset from the measurement data using the at least one processing unit.

35. The machine readable medium of claim 33, wherein the portion of the measurement data corresponding to data obtained from x-rays that are substantially parallel to the view direction of the projection image comprises data obtained from x-rays that are at an angle of between 0° and about 45° with respect to the view direction.

36. The machine readable medium of claim 35, wherein the portion of the measurement data corresponding to x-rays that are substantially parallel to a view direction of the projection image comprises data obtained from x-rays that are at an angle of between 0° and about 15° with respect to the view direction.

37. The machine readable medium of claim 36, wherein the portion of the measurement data corresponding to x-rays that are substantially parallel to a view direction of the projection image comprises data obtained from x-rays that are at an angle of between 0° and about 5° with respect to the view direction.

38. The machine readable medium of claim 33, wherein the second voxel dimensions are equal to the first voxel dimensions.

39. The machine readable medium of claim 33, wherein at least one of the second voxel dimensions is smaller than a corresponding first voxel dimension.

40. The machine readable medium of claim 33, wherein at least one of the second voxel dimensions is larger than a corresponding first voxel dimension.

41. The machine readable medium of claim 33, wherein the programmable processing unit further operates to rotate coordinate axes of the first volumetric dataset or the reconstructed second volumetric dataset to align with the view direction.

42. The machine readable medium of claim 41, wherein the rotating of coordinate axes of the first volumetric dataset or the reconstructed second volumetric dataset comprises performing a linear interpolation or a Cartesian-to-polar mapping.

43. The machine readable medium of claim 34, wherein the computing of the first volumetric dataset or the reconstructed second volumetric dataset comprises applying a direct reconstruction technique, or an iterative reconstruction technique, or both.

44. The machine readable medium of claim 43, wherein the iterative reconstruction technique comprises one or more of a simultaneous algebraic reconstruction technique (SART), a simultaneous iterative reconstruction technique (SIRT), ordered subset convex technique (OSC), an adaptive statistical iterative reconstruction technique (ASIR), an OS-separable paraboloidal surrogates technique (OS-SPS), an algebraic reconstruction technique (ART), or a Kacsmarz reconstruction technique.

45. The machine readable medium of claim 33, wherein the measurement data represents density of at least the portion of the object.

46. The machine readable medium of claim 33, wherein the measurement data represents effective atomic number of at least the portion of the object.

47. The machine readable medium of claim 33, wherein the projection image is an orthographic projection.

48. The machine readable medium of claim 33, wherein the projection image is a perspective projection.

* * * * *